(12) United States Patent
Meriaz et al.

(10) Patent No.: US 9,813,898 B2
(45) Date of Patent: *Nov. 7, 2017

(54) CONCEPTS FOR OUTBOUND CALL CONTROL ON A MOBILE DEVICE

(71) Applicant: MBTE Holdings Sweden AB, Goeteborg (SE)

(72) Inventors: Yoram Meriaz, Tel-Aviv (IL); Ran Meriaz, Warner Robins, GA (US); Alex Tkachman, Holon (IL)

(73) Assignee: MBTE Holdings Sweden AB, Goeteborg (SE)

( * ) Notice: Subject to any disclaimer, the term of this patent is extended or adjusted under 35 U.S.C. 154(b) by 0 days.

This patent is subject to a terminal disclaimer.

(21) Appl. No.: 15/609,227

(22) Filed: May 31, 2017

(65) Prior Publication Data

US 2017/0265065 A1    Sep. 14, 2017

Related U.S. Application Data

(63) Continuation of application No. 14/265,730, filed on Apr. 30, 2014.

(Continued)

(51) Int. Cl.
  *H04W 8/22* (2009.01)
  *H04M 1/725* (2006.01)
  *H04M 1/2745* (2006.01)

(52) U.S. Cl.
  CPC ......... *H04W 8/22* (2013.01); *H04M 1/72522* (2013.01); *H04M 1/2745* (2013.01); *H04M 1/72561* (2013.01); *H04M 1/72597* (2013.01)

(58) Field of Classification Search
  CPC . H04W 8/22; H04M 1/72522; H04M 1/2745; H04M 1/72561; H04M 1/72597
  See application file for complete search history.

(56) References Cited

U.S. PATENT DOCUMENTS

| 5,758,286 A | 5/1998 | Leppanen |
| 6,456,234 B1 | 9/2002 | Johnson |

(Continued)

FOREIGN PATENT DOCUMENTS

| EP | 1435720 A2 | 7/2004 |
| WO | WO 2010/073237 A2 | 7/2010 |

OTHER PUBLICATIONS

International Preliminary Examining Authority, International Preliminary Report on Patentability for International Application No. PCT/US2014/036306, dated Jul. 10, 2015, 16 pages, European Patent Office, The Netherlands.

(Continued)

*Primary Examiner* — Joseph Dean, Jr.
(74) *Attorney, Agent, or Firm* — Alston & Bird LLP

(57) ABSTRACT

Computer program products, methods, systems, apparatus, and computing entities are provided for call control. In one embodiment, it can be determined whether an outbound phone number is one of a plurality of target telephone numbers. Responsive to determining that the outbound phone number is one of the plurality of target telephone numbers, one or more call control rules associated with the outbound phone number can be identified. Responsive to identifying the one or more call control rules associated with the outbound phone number, one or more actions to be carried out by the apparatus in accordance with the one or more call control rules can be identified.

18 Claims, 10 Drawing Sheets

Related U.S. Application Data

(60) Provisional application No. 61/818,214, filed on May 1, 2013.

(56) References Cited

U.S. PATENT DOCUMENTS

| | | |
|---|---|---|
| 6,501,948 B1 | 12/2002 | Salin |
| 7,103,151 B2 | 9/2006 | Lass et al. |
| 7,197,321 B2 | 3/2007 | Erskine et al. |
| 7,272,392 B2 | 9/2007 | Boda |
| 7,353,016 B2 | 4/2008 | Roundtree et al. |
| 7,362,698 B2 | 4/2008 | Christensen et al. |
| 7,545,760 B1 | 6/2009 | Daniel et al. |
| 7,548,915 B2 | 6/2009 | Ramer et al. |
| 7,710,290 B2 | 5/2010 | Johnson |
| 8,036,160 B1 | 10/2011 | Oakes, III |
| 8,238,922 B2 | 8/2012 | Parameswar |
| 8,243,724 B2 | 8/2012 | Meriaz et al. |
| 8,275,102 B2 | 9/2012 | Zheng et al. |
| 8,275,352 B2 | 9/2012 | Forstall et al. |
| 8,295,801 B2 | 10/2012 | Ray et al. |
| 8,498,290 B2 | 7/2013 | Hughston |
| 8,644,485 B1 | 2/2014 | Vendrow et al. |
| 2002/0077085 A1 | 6/2002 | Kalish et al. |
| 2004/0052346 A1 | 3/2004 | Ohta et al. |
| 2004/0185824 A1 | 9/2004 | Cheng |
| 2004/0266422 A1 | 12/2004 | Hotze et al. |
| 2008/0133580 A1 | 6/2008 | Wanless et al. |
| 2008/0205608 A1 | 8/2008 | Tal et al. |
| 2008/0261603 A1 | 10/2008 | Sever et al. |
| 2009/0046843 A1 | 2/2009 | Baciu et al. |
| 2009/0262733 A1 | 10/2009 | Olson |
| 2011/0249666 A1 | 10/2011 | Holbrook et al. |
| 2013/0013750 A1* | 1/2013 | Butler .................. H04L 67/28 709/219 |
| 2013/0210393 A1 | 8/2013 | Hillier |
| 2014/0329514 A1 | 11/2014 | Meriaz et al. |
| 2016/0037297 A1 | 2/2016 | Meriaz et al. |

OTHER PUBLICATIONS

International Preliminary Examining Authority, Written Opinion (second) for International Application No. PCT/US2014/036306, dated Apr. 1, 2015, 7 pages, European Patent Office, The Netherlands.

International Searching Authority, International Search Report and Written Opinion for International Application No. PCT/US2014/036306, dated Jun. 30, 2014, 9 pages, European Patent Office, The Netherlands.

United States Patent and Trademark Office, Notice of Allowance for U.S. Appl. No. 14/265,730, dated Apr. 11, 2017, 8 pages, U.S.A.

United States Patent and Trademark Office, Office Action for U.S. Appl. No. 14/265,730, dated Sep. 21, 2015, 11 pages, U.S.A.

United States Patent and Trademark Office, Office Action for U.S. Appl. No. 14/265,730, dated Apr. 18, 2016, 11 pages, U.S.A.

United States Patent and Trademark Office, Office Action for U.S. Appl. No. 14/265,730, dated Dec. 23, 2016, 9 pages, U.S.A.

* cited by examiner

| | A | B | C | D | E | F |
|---|---|---|---|---|---|---|
| Key1 | TARGET_NUMBER | THIRD_PARTY_SOURCE | URL | RULE_1 | RULE_2 | |
| 1 | 1-888-987-4357 | SAMSUNG | http://www.samsung.com/us/support/contact | TERMINATE CALLS BETWEEN 19:00 - 07:00 EST | OPEN BROWSER TO URL |
| 2 | 1-404-773-0305 | DELTA | http://www.delta.com/content/www/support | IF FIRST CALL, TERMINATE CALL | OPEN BROWSER TO URL |
| 3 | 1-800-823-4929 | DISH | https://dishnetwork.custhelp.com/app/chat | ALWAYS ALLOW | OPEN BROWSER DURING CALL TO URL |

Fig. 5

CONCEPTS FOR OUTBOUND CALL CONTROL ON A MOBILE DEVICE

CROSS-REFERENCE TO RELATED APPLICATIONS

This application is a continuation of Ser. No. 14/265,730 filed Apr. 30, 2014, which claims priority to U.S. Provisional Application No. 61/818,214 filed May 1, 2013, which is hereby incorporated herein in its entirety by reference.

BACKGROUND

The number of applications resident on mobile devices has exploded. However, users may decide to only download and install select applications for third parties regardless of what is available. Irrespective of whether third-party applications are resident on a particular mobile device, third parties may desire to direct or control some of the inbound and/or outbound calls from and to the third parties to present the users with additional information for a call, redirect the user to web-based solutions, and/or the like.

BRIEF SUMMARY

In general, embodiments of the present invention provide methods, apparatus, systems, computing devices, computing entities, and/or the like for call control.

In accordance with one aspect, a method for call control is provided. In one embodiment, the method comprises (1) receiving input from a user identifying an outbound phone number to establish an outbound voice call; (2) determining whether the outbound phone number is one of a plurality of target phone numbers; (3) responsive to determining that the outbound phone number is one of the plurality of target phone numbers, identifying one or more outbound call control rules associated with the outbound phone number; and (4) responsive to identifying the one or more outbound call control rules associated with the outbound phone number, (a) initiating an interactive interface for display via the mobile device (i) based at least in part on the one or more outbound call control rules, and (ii) in lieu of establishing an outbound voice call to the outbound phone number, and (b) not instructing and not providing the outbound phone number to (i) a server to establish the outbound voice call with the mobile device or (ii) a wireless network to establish the outbound voice call with the mobile device.

In accordance with another aspect, a computer program product for call control is provided. The computer program product may comprise at least one computer-readable storage medium having computer-readable program code portions stored therein, the computer-readable program code portions comprising executable portions configured to (1) receive input from a user identifying an outbound phone number to establish an outbound voice call; (2) determine whether the outbound phone number is one of a plurality of target phone numbers; (3) responsive to determining that the outbound phone number is one of the plurality of target phone numbers, identify one or more outbound call control rules associated with the outbound phone number; and (4) responsive to identifying the one or more outbound call control rules associated with the outbound phone number, (a) initiate an interactive interface for display via the mobile device (i) based at least in part on the one or more outbound call control rules, and (ii) in lieu of establishing an outbound voice call to the outbound phone number, and (b) not instruct and not provide the outbound phone number to (i) a server to establish the outbound voice call with the mobile device or (ii) a wireless network to establish the outbound voice call with the mobile device.

In accordance with yet another aspect, an apparatus comprising at least one processor and at least one memory including computer program code is provided. In one embodiment, the at least one memory and the computer program code may be configured to, with the processor, cause the apparatus to (1) receive input from a user identifying an outbound phone number to establish an outbound voice call; (2) determine whether the outbound phone number is one of a plurality of target phone numbers; (3) responsive to determining that the outbound phone number is one of the plurality of target phone numbers, identify one or more outbound call control rules associated with the outbound phone number; and (4) responsive to identifying the one or more outbound call control rules associated with the outbound phone number, (a) initiate an interactive interface for display via the mobile device (i) based at least in part on the one or more outbound call control rules, and (ii) in lieu of establishing an outbound voice call to the outbound phone number, and (b) not instruct and not provide the outbound phone number to (i) a server to establish the outbound voice call with the mobile device or (ii) a wireless network to establish the outbound voice call with the mobile device.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

FIGS. 5-10 show exemplary input and output produced by various embodiments of the present invention.

DETAILED DESCRIPTION

Figure 1:
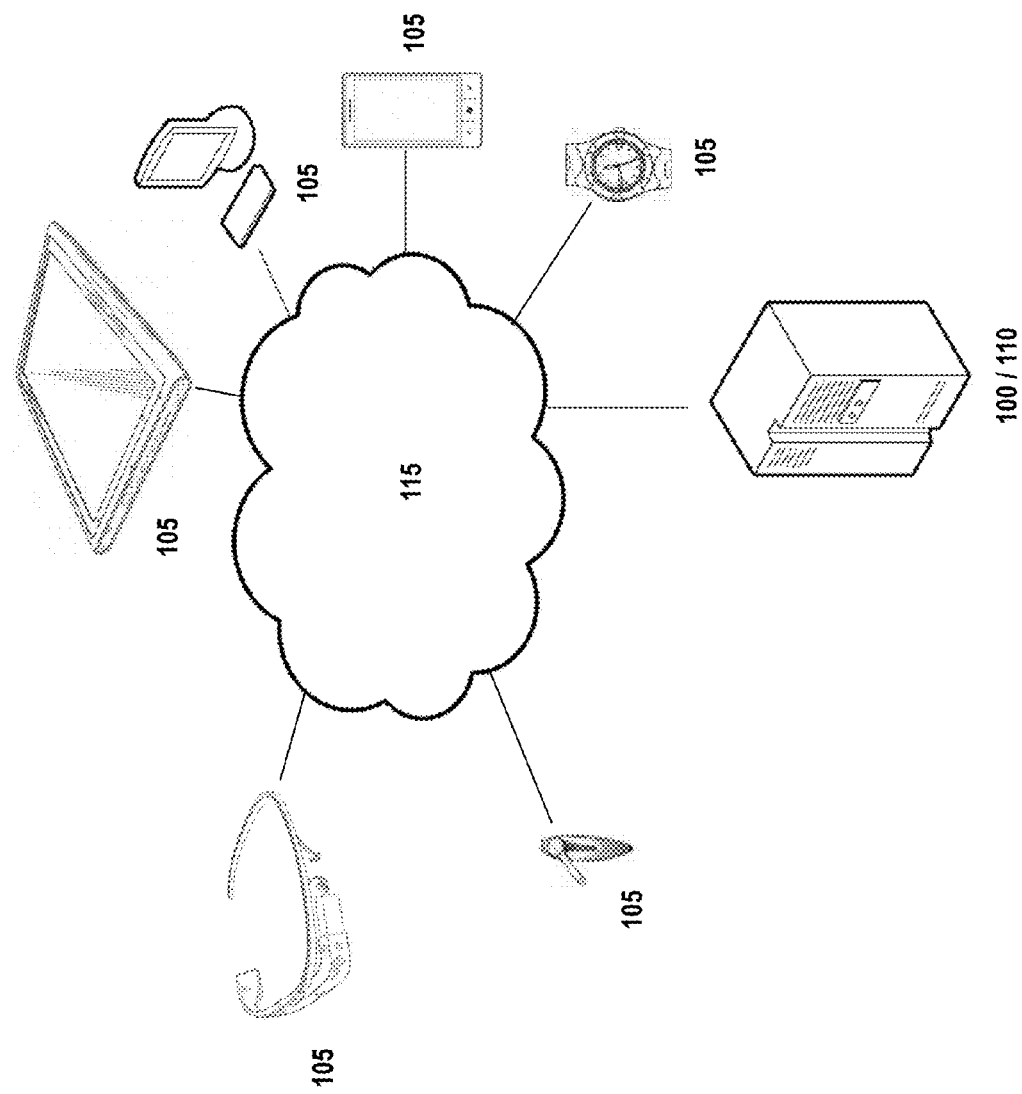
FIG. 1 is an overview of a system that can be used to practice embodiments of the present invention.

Various embodiments of the present invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. The terms "illustrative" and "exemplary" are used to be examples with no indication of quality level. Like numbers refer to like elements throughout.

I. Computer Program Products, Methods, and Computing Entities

Embodiments of the present invention may be implemented in various ways, including as computer program products that comprise articles of manufacture. A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (e.g., a solid state drive (SSD), solid state card (SSC), solid state module (SSM), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present invention may also be implemented as methods, apparatus, systems, computing devices, computing entities, and/or the like. As such, embodiments of the present invention may take the form of an apparatus, system, computing device, computing entity, and/or the like executing instructions stored on a computer-readable storage medium to perform certain steps or operations. Thus, embodiments of the present invention may also take the form of an entirely hardware embodiment, an entirely computer program product embodiment, and/or an embodiment that comprises combination of computer program products and hardware performing certain steps or operations.

Embodiments of the present invention are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

II. Exemplary System Architecture

FIG. 1 provides an illustration of an exemplary embodiment of the present invention. As shown in FIG. 1, this particular embodiment may include one or more call management computing entities 100, one or more mobile devices 105, one or more third-party systems 110, and one or more networks 115. Each of these components, entities, devices, systems, and similar words used herein interchangeably may be in direct or indirect communication with, for example, one another over the same or different wired or wireless networks. Additionally, while FIG. 1 illustrates the various system entities as separate, standalone entities, the various embodiments are not limited to this particular architecture.

1. Call Management Computing Entity

Figure 2:
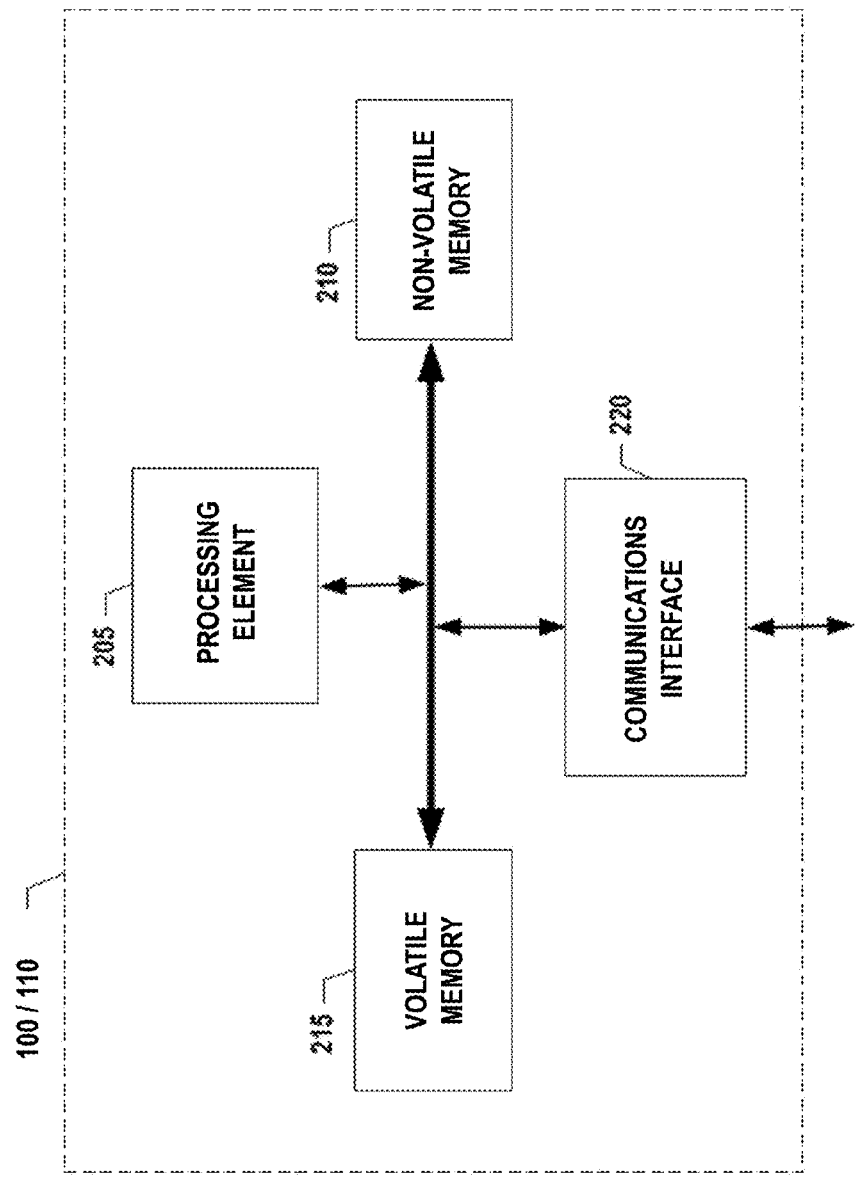
FIG. 2 is an exemplary schematic diagram of a computing entity according to one embodiment of the present invention.

FIG. 2 provides a schematic of a call management computing entity 100 according to one embodiment of the present invention. In general, the terms computing entity, entity, device, system, and/or similar words used herein interchangeably may refer to, for example, one or more computers, computing entities, desktops, mobile phones, tablets, phablets, notebooks, laptops, distributed systems, gaming consoles (e.g., Xbox, Play Station, Wii), watches, glasses, key fobs, radio frequency identification (RFID) tags, ear pieces, scanners, televisions, dongles, cameras, wristbands, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein interchangeably. In one embodiment, these functions, operations, and/or processes can be performed on data, content, information, and/or similar terms used herein interchangeably.

As indicated, in one embodiment, the call management computing entity 100 may also include one or more communications interfaces 220 for communicating with various computing entities, such as by communicating data, content, information, and/or similar terms used herein interchangeably that can be transmitted, received, operated on, processed, displayed, stored, and/or the like.

As shown in FIG. 2, in one embodiment, the call management computing entity 100 may include or be in communication with one or more processing elements 205 (also referred to as processors, processing circuitry, and/or similar terms used herein interchangeably) that communicate with other elements within the call management computing entity 100 via a bus, for example. As will be understood, the processing element 205 may be embodied in a number of different ways. For example, the processing element 205 may be embodied as one or more complex programmable logic devices (CPLDs), microprocessors, multi-core processors, coprocessing entities, application-specific instruction-set processors (ASIPs), and/or controllers. Further, the processing element 205 may be embodied as one or more other processing devices or circuitry. The term circuitry may refer to an entirely hardware embodiment or a combination of hardware and computer program products. Thus, the processing element 205 may be embodied as integrated circuits, application specific integrated circuits (ASICs), field programmable gate arrays (FPGAs), programmable logic arrays (PLAs), hardware accelerators, other circuitry, and/or the like. As will therefore be understood, the processing element 205 may be configured for a particular use or configured to execute instructions stored in volatile or non-volatile media or otherwise accessible to the processing element 205. As such, whether configured by hardware or computer program products, or by a combination thereof, the processing element 205 may be capable of performing steps or operations according to embodiments of the present invention when configured accordingly.

In one embodiment, the call management computing entity 100 may further include or be in communication with non-volatile media (also referred to as non-volatile storage, memory, memory storage, memory circuitry and/or similar terms used herein interchangeably). In one embodiment, the non-volatile storage or memory may include one or more non-volatile storage or memory media 210 as described above, such as hard disks, ROM, PROM, EPROM, EEPROM, flash memory, MMCs, SD memory cards, Memory Sticks, CBRAM, PRAM, FeRAM, RRAM, SONOS, racetrack memory, and/or the like. As will be recognized, the non-volatile storage or memory media may store databases, database instances, database management systems, data, applications, programs, program modules, scripts, source code, object code, byte code, compiled code, interpreted code, machine code, executable instructions, and/or the like. The term database, database instance, database management system, and/or similar terms used herein interchangeably may refer to a collection of records or data that is stored in a computer-readable storage medium using one or more database models, such as a hierarchical database model, network model, relational model, entity—relationship model, object model, document model, semantic model, graph model, and/or the like.

In one embodiment, the call management computing entity 100 may further include or be in communication with volatile media (also referred to as volatile storage, memory, memory storage, memory circuitry and/or similar terms used herein interchangeably). In one embodiment, the volatile storage or memory may also include one or more volatile storage or memory media 215 as described above, such as RAM, DRAM, SRAM, FPM DRAM, EDO DRAM, SDRAM, DDR SDRAM, DDR2 SDRAM, DDR3 SDRAM, RDRAM, SIMM VRAM, cache memory, register memory, and/or the like. As will be recognized, the volatile storage or memory media may be used to store at least portions of the databases, database instances, database management systems, data, applications, programs, program modules, scripts, source code, object code, byte code, compiled code, interpreted code, machine code, executable instructions, and/or the like being executed by, for example, the processing element 205. Thus, the databases, database instances, database management systems, data, applications, programs, program modules, scripts, source code, object code, byte code, compiled code, interpreted code, machine code, executable instructions, and/or the like may be used to control certain aspects of the operation of the call management computing entity 100 with the assistance of the processing element 205 and operating system.

As indicated, in one embodiment, the call management computing entity 100 may also include one or more communications interfaces 220 for communicating with or various computing entities, such as by communicating data, content, information, and/or similar terms used herein interchangeably that can be transmitted, received, operated on, processed, displayed, stored, and/or the like. Such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the call management computing entity 100 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1X (1xRTT), Wideband Code Division Multiple Access (WCDMA), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), 802.16 (WiMAX), ultra wideband (UWB), infrared (IR) protocols, Bluetooth protocols, wireless universal serial bus (USB) protocols, and/or any other wireless protocol. Via such communication protocols, the call management computing entity 100 can communicate with the mobile device 105, the third-party computing entity 110, and/or various other computing entities.

Although not shown, the call management computing entity 100 may include or be in communication with one or more input elements, such as a keyboard input, a mouse input, a touch screen/display input, audio input, pointing device input, joystick input, keypad input, and/or the like. The call management computing entity 100 may also include or be in communication with one or more output elements (not shown), such as audio output, video output, screen/display output, motion output, movement output, and/or the like.

As will be appreciated, one or more of the computing entity's 100 components may be located remotely from other call management computing entity 100 components, such as in a distributed system. Furthermore, one or more of the components may be combined and additional components performing functions described herein may be included in the call management computing entity 100. Thus, the call management computing entity 100 can be adapted to accommodate a variety of needs and circumstances.

2. Exemplary Mobile Device

Figure 3:
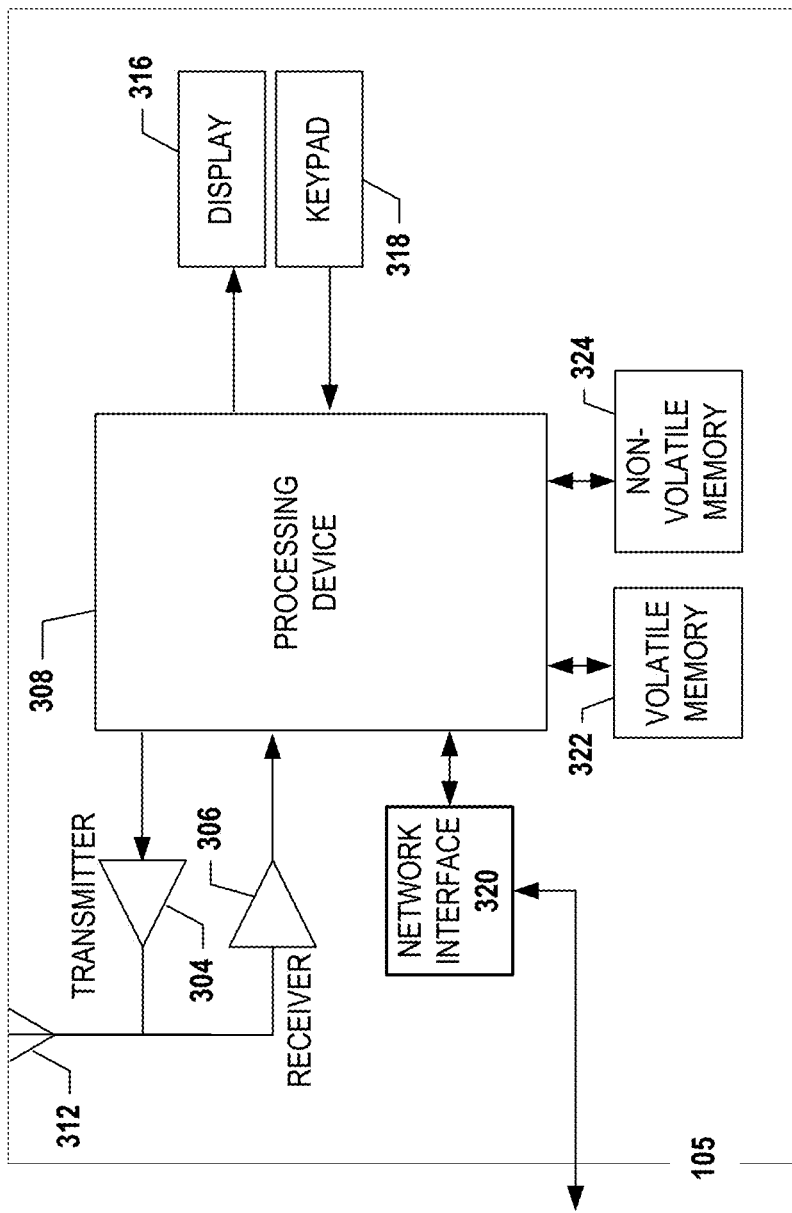
FIG. 3 is an exemplary schematic diagram of a mobile device according to one embodiment of the present invention.

FIG. 3 provides an illustrative schematic representative of a mobile device 105 that can be used in conjunction with embodiments of the present invention. In general, the terms device, system, computing entity, entity, and/or similar words used herein interchangeably may refer to, for example, one or more computers, computing entities, desktops, mobile phones, tablets, phablets, notebooks, laptops, distributed systems, gaming consoles (e.g., Xbox, Play Station, Wii), watches, glasses, key fobs, RFID tags, ear pieces, scanners, televisions, dongles, cameras, wristbands, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. As shown in FIG. 3, the mobile device 105 can include an antenna 312, a transmitter 304 (e.g., radio), a receiver 306 (e.g., radio), and a processing element 308 (such as those described above with regard to the call management computing entity 100) that provides signals to and receives signals from the transmitter 304 and receiver 306, respectively.

The signals provided to and received from the transmitter 304 and the receiver 306, respectively, may include signaling information in accordance with air interface standards of applicable wireless systems. In this regard, the mobile device 105 may be capable of operating with one or more air interface standards, communication protocols, modulation types, and access types. More particularly, the mobile device 105 may operate in accordance with any of a number of wireless communication standards and protocols, such as those described above with regard to the call management computing entity 100. In a particular embodiment, the mobile device 105 may operate in accordance with multiple wireless communication standards and protocols, such as UMTS, CDMA2000, 1xRTT, WCDMA, TD-SCDMA, LTE, E-UTRAN, EVDO, HSPA, HSDPA, Wi-Fi, WiMAX, UWB, IR, Bluetooth, USB, and/or the like. Via such communication protocols, the mobile device 105 can communicate with the call management computing entity 100, the third-party computing entity 110, and/or various other computing entities.

Via these communication standards and protocols, the mobile device 105 can communicate with various other entities using concepts such as Unstructured Supplementary Service Data (USSD), Short Message Service (SMS), Multimedia Messaging Service (MMS), Dual-Tone Multi-Frequency Signaling (DTMF), and/or Subscriber Identity Module Dialer (SIM dialer). The mobile device 105 can also download changes, add-ons, and updates, for instance, to its firmware, software (e.g., including executable instructions, applications, program modules), and operating system. In one embodiment, the mobile device 105 may be executing an application initiating program that is resident on the mobile device 105. In one embodiment, the application initiating program may comprise, be associated with, or be in communication with an application initiating database. The application initiating program may also be associated with or be in communication with the call management computing entity 100 that comprises an application initiating database.

According to one embodiment, the mobile device 105 may include location determining aspects, devices, modules, functionalities, and/or similar words used herein interchangeably. For example, the mobile device 105 may include outdoor positioning aspects, such as a location module adapted to acquire, for example, latitude, longitude, altitude, geocode, course, direction, heading, speed, universal time (UTC), date, and/or various other information/data. In one embodiment, the location module can acquire data, sometimes known as ephemeris data, by identifying the number of satellites in view and the relative positions of those satellites. The satellites may be a variety of different satellites, including Low Earth Orbit (LEO) satellite systems, Department of Defense (DOD) satellite systems, the European Union Galileo positioning systems, the Chinese Compass navigation systems, Indian Regional Navigational satellite systems, and/or the like. Alternatively, the location information can be determined by triangulating the mobile device's 105 position in connection with a variety of other systems, including cellular towers, Wi-Fi access points, and/or the like. Similarly, the mobile device 105 may include indoor positioning aspects, such as a location module adapted to acquire, for example, latitude, longitude, altitude, geocode, course, direction, heading, speed, time, date, and/or various other information/data. Some of the indoor systems may use various position or location technologies including RFID tags, indoor beacons or transmitters, Wi-Fi access points, cellular towers, nearby computing devices (e.g., smartphones, laptops) and/or the like. For instance, such technologies may include the iBeacons, Gimbal proximity beacons, Bluetooth Low Energy (BLE) transmitters, NFC transmitters, and/or the like. These indoor positioning aspects can be used in a variety of settings to determine the location of someone or something to within inches or centimeters.

The mobile device 105 may also comprise a user interface (that can include a display 316 coupled to a processing element 308) and/or a user input interface (coupled to a processing element 308). The user input interface can comprise any of a number of devices allowing the user computing entity 110 to receive data, such as a keypad 318 (hard or soft), a touch display, voice/speech or motion interfaces, or other input device. In embodiments including a keypad 318, the keypad 318 can include (or cause display of) the conventional numeric (0-9) and related keys (#, *), and other keys used for operating the user computing entity 110 and may include a full set of alphabetic keys or set of keys that may be activated to provide a full set of alphanumeric keys. In addition to providing input, the user input interface can be used, for example, to activate or deactivate certain functions, such as screen savers and/or sleep modes.

The mobile device 105 can also include volatile storage or memory 322 and/or non-volatile storage or memory 324, which can be embedded and/or may be removable. For example, the non-volatile memory may be ROM, PROM, EPROM, EEPROM, flash memory, MMCs, SD memory cards, Memory Sticks, CBRAM, PRAM, FeRAM, RRAM, SONOS, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, RIMM, DIMM, SIMM, VRAM, cache memory, register memory, and/or the like. The volatile and non-volatile storage or memory can store databases, database instances, database management systems, data, applications, programs, program modules, scripts, source code, object code, byte code, compiled code, interpreted code, machine code, executable instructions, and/or the like to implement the functions of the mobile device 105.

In another embodiment, the mobile device 105 may include one or more components that are functionally similar to those of the call management computing entity 100, as described in greater detail above.

3. Exemplary Third-Party Computing Entity

A third-party may be an individual, a family, a company, an organization, an entity, a department within an organization, a representative of an organization and/or person, and/or the like. In one embodiment, each third-party computing entity 110 may include one or more components that are functionally similar to those of the call management computing entity 100 and/or the mobile device 105. For example, each third-party computing entity 110 may include one or more processing elements, one or more display device/input devices (e.g., including user interfaces), volatile and non-volatile storage or memory, and/or one or more communications interfaces. This may enable to the third-party computing entity 110 to communicate with various other computing entities, such as call management computing entities 100, mobile devices 105, and/or various other computing entities. These architectures are provided for exemplary purposes only and are not limiting to the various embodiments. The term computing entity may refer to one or more computers, computing devices, computing entities, mobile phones, desktops, tablets, notebooks, laptops, distributed systems, servers, blades, gateways, switches, processing devices, processing entities, relays, routers, network access points, base stations, the like, and/or any combination of devices or entities adapted to perform the functions described herein.

III. Exemplary System Operation

Figure 4:
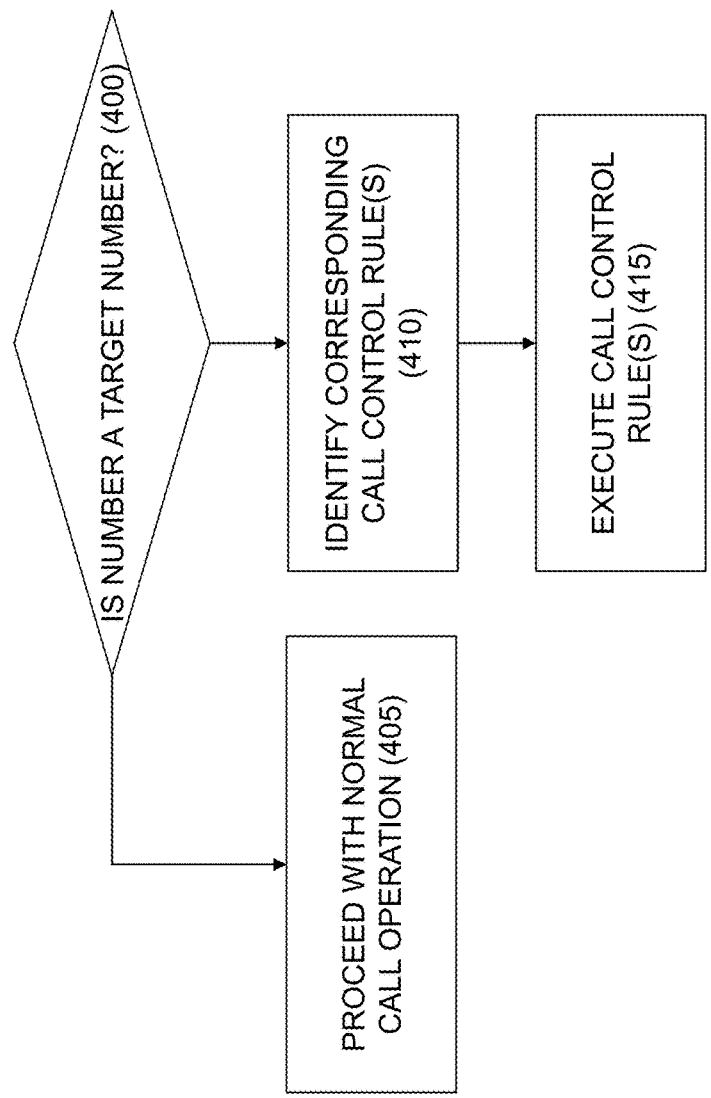
FIG. 4 is a flowchart illustrating operations and processes that can be used in accordance with various embodiments of the present invention.
Figure 6:
Figure 7:
Figure 8:
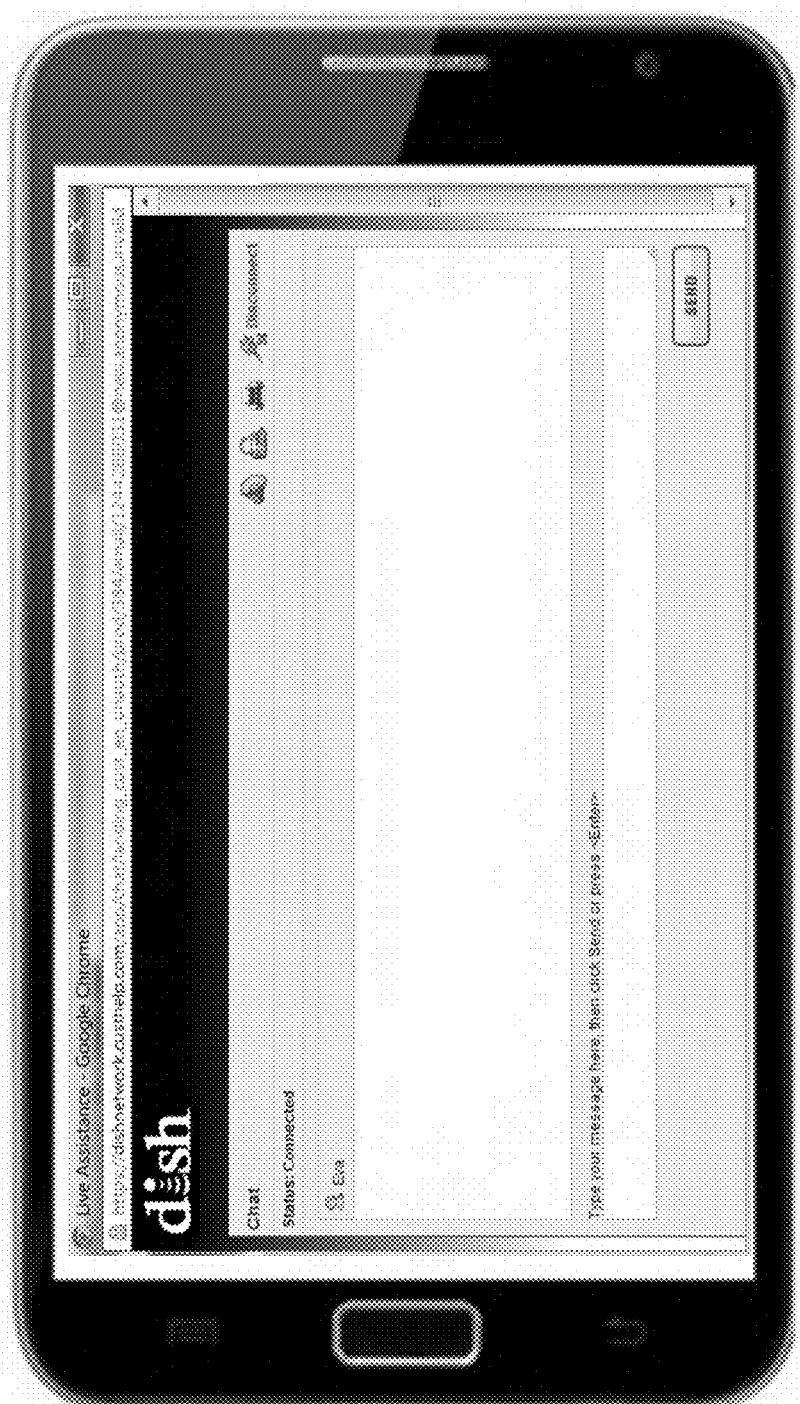
Figure 9:
Figure 10:

Reference will now be made to FIGS. 4-8. FIG. 4 is a flowchart illustrating operations and processes that may be performed for initiating applications/programs based on inbound or outbound telephone phone numbers. FIGS. 5-10 show exemplary input and output produced by various embodiments of the present invention.

1. Registration

In one embodiment, to take advantage of the features described herein, a third party may need to register for services with a call management computing entity 100. The services provided by the call management computing entity 100 may be provided on a free basis, a subscription basis, a pay-per-use basis, and/or the like. As will be recognized, a variety of other approaches and techniques can be used to adapt to various needs and circumstances.

As part of or after registration, the third-party (e.g., operating a third-party computing entity 110) may provide one or more telephone numbers (e.g., target telephone numbers) associated with the third party and for which the third party would like mobile devices 105 (e.g., executing application initiation programs) to perform certain actions before, simultaneously to, during, and/or after calling or receiving a call from such numbers. The telephone numbers (e.g., target telephone numbers) provided by the third-party (e.g., operating a third-party computing entity 110) may be stored by the call management computing entity 100 for use by the call management computing entity 100 (e.g., in communication with the mobile device 105) and/or mobile devices 105 (e.g., executing application initiation programs). Such numbers may also be stored by the mobile device 105 (e.g., executing an application initiation program). For example, assume Samsung, Delta, and Dish are all registering for services with the call management computing entity 100. In this example, Samsung may provide a target telephone number of 1-888-987-4357, Delta may provide a target telephone number of 1-404-773-0305, and Dish may provide a target telephone number of 1-800-823-4929. As will be recognized, a third party is not limited to providing a single telephone number; rather, multiple telephone numbers (e.g., target telephone numbers) may be provided to the call management computing entity 100. The telephone numbers may include country codes, area codes, region codes, and/or the like.

In addition to the one or more telephone numbers (e.g., target telephone numbers), the third-party (e.g., operating a third-party computing entity 110) may also provide one or more uniform resource locators (URLs) or uniform resource identifiers (URIs) to which users of mobile devices 105 should be directed and/or identify one or more applications that should be initiated in response to the user of a mobile device 105 (e.g., executing an application initiation program) calling or receiving calls from the specified number. For example, for mobile devices 105 calling or receiving calls from Samsung's 1-888-987-4357, Samsung may want an Internet browser, user application, user interface, and/or similar words used herein interchangeably initiated, launched, opened, and/or similar words used herein interchangeably to http://www.samsung.com/us/support/contact. Similarly, for mobile devices 105 calling or receiving calls from Delta's 1-404-773-0305, Delta may want an Internet browser initiated to http://www.delta.com/content/www/support. And for mobile devices 105 calling or receiving calls from Dish's 1-800-823-4929, Dish may want a chat initiated with the user of the mobile device via, for example, a Dish application installed on the mobile device 105 or accessible via a browser at URL https://dishnetwork.custhelp.com/app/chat. As will be recognized, a third party is not limited to providing a single URL or URI; rather, multiple URLs or URIs that correspond to different rules, times, and/or the like may be provided to the call management computing entity 100.

In addition to the one or more telephone numbers (e.g., target telephone numbers) and one or more URLs or URIs, the third-party (e.g., operating a third-party computing entity 110) may also define one or more call control rules for determining/identifying whether an application should be initiated in response to the user of a mobile device 105 (e.g., executing an application initiation program) calling or receiving a call from a specified number. For example, Samsung may define rules (e.g., via a third-party computing entity 110) to the call management computing entity 100 (e.g., in communication with the mobile device 105) indicating that for mobile devices 105 that call or receive calls from 1-888-987-4357 between 19:00-07:00 Eastern Standard Time, Samsung wants an Internet browser initiated on the corresponding mobile device 105 to open to http://www.samsung.com/us/support/contact. This may allow Samsung, for example, to route calls for technical support during non-business hours to its webpage. In another example, Delta may define rules (e.g., via a third-party computing entity 110) to the call management computing entity 100 (e.g., in communication with the mobile device 105) indicating that for mobile devices 105 that call or receive calls from 1-404-773-0305 for the first time, Delta wants an Internet browser initiated on the corresponding mobile device 105 to open to http://www.delta.com/content/www/support. This may allow Delta, for instance, to route first time callers to a welcome or support webpage. And in another example, Dish may define rules (e.g., via a third-party computing entity 110) to the call management computing entity 100 (e.g., in communication with the mobile device 105) indicating that for mobile devices 105 that call or receive calls from 1-800-823-4929, Dish wants a Dish application resident on the mobile device 105 initiated to open to a chat session for all calls or a browser initiated to open to a URL https://dishnetwork.custhelp.com/app/chat to open to a chat session for all calls (See FIG. 8). This may allow Dish to have chat sessions during or in lieu of voice calls that can be used for a variety of purposes.

As will be recognized, a third party is not limited to providing a single rule; rather, multiple rules be provided to the call management computing entity 100. Such rules may define the applications that should be initiated, e.g., a web browser, a new tab in an open web browser, an application resident on the mobile device 105 (e.g., a Samsung, Delta, or Dish application), and/or the like. The call control rules may define time frames (e.g., times of day, days of the week, holidays, and/or the like) in which the applications should be initiated or other circumstances defined by the third party. The call control rules may define when the application should be initiated, such as before, simultaneous to, during, and/or after calling or receiving a call from such numbers. The call control rules may also define whether the mobile device 105 should establish, terminate/block, or suspend calls in addition to taking or carrying out the other actions.

In one embodiment, the telephone numbers (e.g., target telephone numbers), URLs, rules, and/or the like can be stored locally in databases on mobile devices 105 (e.g., executing application initiation programs), such as is shown in FIG. 5. In such an embodiment, the call management computing entity 100 (e.g., in communication with the mobile devices 105) can update the same regularly, periodically, continuously, and/or in response to certain triggers. In another embodiment, the telephone numbers (e.g., target telephone numbers), URLs, rules, and/or the like can be stored remotely by the call management computing entity 100 (e.g., in communication with the mobile device 105), such as is shown in FIG. 5. In this embodiment, mobile devices 105 (e.g., executing application initiation programs) may need to communicate in real time or near real time with the call management computing entity 100 to determine/identify whether any actions should be taken with regard to a given phone number. As will be recognized, a variety of other approaches and techniques can be used to adapt to various needs and circumstances.

2. Number Identification

After the telephone numbers (e.g., target telephone numbers), URLs, rules, and/or the like have been provided to the call management computing entity 100 (e.g., in communication with the mobile device 105), a mobile device 105 (e.g., executing an application initiation program) placing an outbound call or receiving an inbound can determine/identify whether the corresponding inbound or outbound number is one of a plurality of target telephone numbers (Block 400 of FIG. 4). For example, as a user dials a phone number via a mobile device 105 (e.g., executing an application initiation program), the mobile device 105 (e.g., executing an application initiation program) can determine/identify whether the dialed number is one of a plurality of target numbers listed in the database. Such an operation may be performed as the user types or once, for example, the user clicks, pushes, selects, and/or other words used herein interchangeably send via the mobile device 105 (e.g., executing an application initiation program). To determine/identify whether the number is one of a plurality of target numbers, the mobile device 105 (e.g., executing an application initiation program) can access a local database to determine/identify whether a corresponding match exists.

In another embodiment, the mobile device 105 (e.g., executing an application initiation program) can transmit the dialed number to the call management computing entity 100 (e.g., in communication with the mobile device 105) to make such determinations. A variety of other approaches and techniques can be used to adapt to various needs and circumstances. For instance, as will be recognized, the same can be applied to calls that are being received by the mobile device 105 (e.g., executing an application initiation program).

In one embodiment, if an inbound or outbound number is determined by the appropriate computing entity to not be a target number, the mobile device 105 (e.g., executing an application initiation program) call allow the call to proceed with normal call operation (Block 405 of FIG. 4). Such normal call operation may include connecting (e.g., establishing) the call between the parties, for example. As will be recognized, a variety of other approaches and techniques can be used to adapt to various needs and circumstances.

3. Rule Identification and Execution

In one embodiment, after determining/identifying that a telephone number corresponding to an inbound call or an outbound call is a target number, the mobile device 105 (e.g., executing an application initiation program) can determine/identify what actions (if any) it should perform based on one or more call control rules defined for the corresponding number (Block 410 of FIG. 4). For example, as discussed above, the call control rules may define whether the call should be established, terminated/blocked, or suspended; whether the mobile device 105 (e.g., executing an application initiation program or other computing entity) should perform any other actions, such as opening a browser or a new tab in a browser to an identified URL or opening an identified application resident on the mobile device 105 (e.g., executing an application initiation program); and/or the like. As will be recognized, in one embodiment, the call management computing entity 100 (e.g., in communication with the mobile device 105) may make such identifications/determinations and provide instructions to the mobile device 105 (e.g., executing an application initiation program) to carry out and/or perform the same (Block 410 of FIG. 4).

For instance, in the above examples, call control rules exist for the telephone numbers associated with Samsung, Delta, and Dish. The call control rules for Samsung define that calls to or received from 1-888-987-4357 between 19:00-07:00 Eastern Standard Time should be not allowed (e.g., should be terminated/blocked), and instead, an Internet browser on the corresponding mobile device 105 should be initiated and opened to http://www.samsung.com/us/support/contact (see FIG. 6). The Delta rules define that calls to 1-404-773-0305 (from the mobile device 105) or received from 1-404-773-0305 (by the mobile device 105) for the first time should be terminated/blocked, and instead, an Internet browser on the corresponding mobile device 105 should be initiated and opened to http://www.delta.com/content/www/support (see FIG. 7). The Dish rules define that calls to or received from 1-800-823-4929 should always be allowed (e.g., established) and a chat session for all calls should be opened in a browser during the call to https://dishnetwork- .custhelp.com/app/chat (see FIG. 8). The chat may be via an Internet browser or Dish application, for instance.

As with determining/identifying whether a number is a target number, the mobile device 105 (e.g., executing an application initiation program) can access a local database to identify any corresponding call control rules. In another embodiment, the call management computing entity 100 can identify the call control rules after determining/identifying that an inbound or outbound number is a target number (e.g., one of a plurality of target numbers). As will be recognized, the call control rules may define a variety of actions that are to be performed by the mobile device 105 (e.g., executing an application initiation program) before, simultaneously to, during, and/or after calling or receiving a call from such target numbers.

After identifying the appropriate call control rules, the mobile device 105 (e.g., executing an application initiation program) can execute the actions specified by the call control rules (Block 415). In one embodiment, this may be independent of the call management computing entity 100 (e.g., in communication with the mobile device 105). In another embodiment, the call management computing entity 100 (e.g., in communication with the mobile device 105) may make such determinations and provide instructions to the mobile device 105 (e.g., executing an application initiation program) to carry out and/or perform the same.

In an embodiment in which a browser or application is initiated, the browser or application may be positioned in a variety of ways with regard to the dialer of the mobile device 105, such as via a split screen, shared screen, overlapping screens, cascading screens, a superimposed screen, and/or simply show each screen individually in the same window simultaneously. In one embodiment, the browser or application that is initiated may also control (e.g., take over) some of the call functionality. For example, the browser or application that is initiated may be used to present a dialer interface through which the user of the mobile device 105 can interact to control the call (see FIG. 10).

In another embodiment, the browser or application that is initiated may be used to accept selections by the user of the mobile device 105 and to provide instructions or commands that can be used or executed by the dialer of the mobile device 105 (or other applications). For example, as described above, the mobile device 105 (e.g., executing an application initiation program) can launch a browser or application before, simultaneously to, or during a call to a target number. In one embodiment, the browser or application may direct the user of the mobile device 105 (e.g., executing an application initiation program) to an interface with information about the parties who have extensions at or who can be reached through the target number (see FIG. 9). For example, the browser or application may provide information that indicates that to speak with Chris, the user of the mobile device 105 (e.g., executing an application initiation program) only needs to select the image of Chris—and likewise for Michelle and Pat. In response to receiving input of the user's selection via the mobile device 105 (e.g., executing an application initiation program), the mobile device 105 can provide the dialer (e.g., using DTMF and/or a variety of other technologies, for example) with the appropriate extension (e.g., extension 106) and automatically dial or input the same for the user. This may or may not involve corresponding communications with the call management computing entity 100 or a third-party computing entity 100. In various embodiments, such features may also be employed to allow users to bypass or navigate one or more prompts of Interactive voice response (IVR) systems, for example. For instance, the browser or application can provide a visual menu for selecting different call options (e.g., companies, departments, people, and/or the like) to dial extensions, navigate IVR systems and menus, and/or the like.

In another example, the browser or application that is initiated may be used to provide contextual information to a call. For instance, a call intercepted as outgoing to the Delta telephone number can be used to provide the user with a visual menu for selecting different call options and also provide the user with information regarding his or her position in the call queue; an expected wait time; providing options to continue, hang up, schedule, or delay the call (see FIG. 10); and/or the like (see FIG. 10). In one embodiment, if the user (e.g., operating an appropriate device/entity) closes the browser or selects hang up, the user may lose his or her place in queue and the call may be disconnected. Further, delaying and scheduling such calls is described in greater detail in U.S. Pat. No. 8,243,724, which is incorporated herein by reference in its entirety and included as an appendix.

In one embodiment, via the browser, third parties, for example, can provide or offer coupons, incentives, offers, advertisements, and/or the like. The user can accept, reject/deny, schedule, or delay the calls for such coupons, incentives, offers, advertisements, and/or the like. As will be recognized, a variety of different approaches and techniques can be used to adapt to various needs and circumstances.

4. Third Party Can Cause Trigger Actions

In one embodiment, in addition to the call management computing entity 100 (e.g., in communication with the mobile device 105) providing instructions to the mobile device 105 (e.g., executing an application initiation program) to carry out and/or perform certain actions, the third-party computing entity 110 can also provide such instructions to mobile devices 105 (e.g., executing application initiation programs). For example, before, simultaneous to, during, and/or after calling a telephone number associated with a mobile device 105, the third-party computing entity 110 can provide instructions to the user's mobile device 105 (e.g., executing an application initiation program) to initiate a browser or other application. For example, assume a user calls Delta using his mobile device 105 (e.g., executing an application initiation program). During the call, a Delta representative may want to provide the user (e.g., operating a mobile device 105) with a mechanism to review flight details and/or pay for the flight. To do so, the third-party (e.g., operating a third-party computing entity 110) may provide such instructions to the mobile device 105 (e.g., executing an application initiation program) for carrying out the same. As will be recognized, the third-party computing entity 110 and/or call management computing entity 100 (e.g., in communication with the mobile device 105) can provide instructions to such mobile devices 105 (e.g., executing an application initiation program) to carry out and/or perform a variety of actions before, simultaneous to, during, and/or after calling a telephone number. As will be recognized, a variety of other approaches and techniques can be used to adapt to various needs and circumstances.

IV. Conclusion

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A method for outbound call control on a mobile device, the method comprising:
   receiving, by a mobile device, input from a user identifying an outbound phone number to establish an outbound voice call;
   determining, by the mobile device, whether the outbound phone number is one of a plurality of target phone numbers;
   responsive to determining that the outbound phone number is one of the plurality of target phone numbers, identifying, by the mobile device, one or more outbound call control rules associated with the outbound phone number; and
   responsive to identifying the one or more outbound call control rules associated with the outbound phone number, (a) initiating, by the mobile device, an interactive interface for display via the mobile device (i) based at least in part on the one or more outbound call control rules, and (ii) in lieu of establishing an outbound voice call to the outbound phone number, and (b) not instructing and not providing the outbound phone number to (i) a server to establish the outbound voice call with the mobile device or (ii) a wireless network to establish the outbound voice call with the mobile device.

2. The method of claim 1, wherein the one or more outbound call control rules comprise a time period for which the one or more outbound call control rules apply.

3. The method of claim 1, wherein the interactive interface is directed to a uniform resource locator.

4. The method of claim 1, wherein the interactive interface displays at least one of an advertisement, a coupon, a queue position, or a wait time.

5. The method of claim 4, wherein (a) the interactive interface displays the queue position for the user, and (b) the method further comprises:
   receiving input from the user closing the interactive interface; and
   responsive to receiving the input from the user closing the interactive interface, releasing the queue position for the user.

6. The method of claim 1 further comprising, subsequent to initiating the interactive interface for display via the mobile device, receiving an inbound voice call from an entity associated with outbound phone number, wherein the interactive interface is displayed during the inbound voice call.

7. A mobile device at least one processor, at least one communications interface, and at least one memory including program code, the at least one memory and the program code configured to, with the processor, cause the mobile device to at least:
   receive input from a user identifying an outbound phone number to establish an outbound voice call;
   determine whether the outbound phone number is one of a plurality of target phone numbers;
   responsive to determining that the outbound phone number is one of the plurality of target phone numbers, identify one or more outbound call control rules associated with the outbound phone number; and
   responsive to identifying the one or more outbound call control rules associated with the outbound phone number, (a) initiate an interactive interface for display via the mobile device (i) based at least in part on the one or more outbound call control rules, and (ii) in lieu of establishing an outbound voice call to the outbound phone number, and (b) not instruct and not provide the outbound phone number to (i) a server to establish the outbound voice call with the mobile device or (ii) a wireless network to establish the outbound voice call with the mobile device.

8. The mobile device of claim 7, wherein the one or more outbound call control rules comprise a time period for which the one or more outbound call control rules apply.

9. The mobile device of claim 7, wherein the interactive interface is directed to a uniform resource locator.

10. The mobile device of claim 7, wherein the interactive interface displays at least one of an advertisement, a coupon, a queue position, or a wait time.

11. The mobile device of claim 10, wherein (a) the interactive interface displays the queue position for the user, and (b) the memory and program code are further configured to, with the processor, cause the mobile device to:
    receive input from the user closing the interactive interface; and
    responsive to receiving the input from the user closing the interactive interface, release the queue position for the user.

12. The mobile device of claim 7, wherein the memory and program code are further configured to, with the processor, cause the mobile device to, subsequent to initiating the interactive interface for display via the mobile device, receive an inbound voice call from an entity associated with outbound phone number, and wherein the interactive interface is displayed during the inbound voice call.

13. A computer program product for outbound call control on a mobile device, the computer program product comprising at least one non-transitory computer-readable storage medium having computer-readable program code portions stored therein for execution by the mobile device, the computer-readable program code portions comprising:
    an executable portion configured to receive input from a user identifying an outbound phone number to establish an outbound voice call;
    an executable portion configured to determine whether the outbound phone number is one of a plurality of target phone numbers;
    an executable portion configured to, responsive to determining that the outbound phone number is one of the plurality of target phone numbers, identify one or more outbound call control rules associated with the outbound phone number; and
    an executable portion configured to, responsive to identifying the one or more outbound call control rules associated with the outbound phone number, (a) initiate an interactive interface for display via the mobile device (i) based at least in part on the one or more outbound call control rules, and (ii) in lieu of establishing an outbound voice call to the outbound phone number, and (b) not instruct and not provide the outbound phone number to (i) a server to establish the outbound voice call with the mobile device or (ii) a wireless network to establish the outbound voice call with the mobile device.

14. The computer program product of claim 13, wherein the one or more outbound call control rules comprise a time period for which the one or more outbound call control rules apply.

15. The computer program product of claim 13, wherein the interactive interface is directed to a uniform resource locator.

16. The computer program product of claim 13, wherein the interactive interface displays at least one of an advertisement, a coupon, a queue position, or a wait time.

17. The computer program product of claim 16, wherein (a) the interactive interface displays the queue position for the user, and (b) further comprising:
- an executable portion configured to receive input from the user closing the interactive interface; and
- an executable portion configured to responsive to receiving the input from the user closing the interactive interface, release the queue position for the user.

18. The computer program product of claim 13 further comprising an executable portion configured to, subsequent to initiating the interactive interface for display via the mobile device, receiving an inbound voice call from an entity associated with outbound phone number, wherein the interactive interface is displayed during the inbound voice call.

\* \* \* \* \*